United States Patent
Grant et al.

(10) Patent No.: US 10,929,488 B2
(45) Date of Patent: Feb. 23, 2021

(54) SEARCH ENGINE FILTER BASED ON USER IOT NETWORK

(71) Applicant: International Business Machines Corporation, Armonk, NY (US)

(72) Inventors: Robert H. Grant, Atlanta, GA (US); Faisal Ghaffar, Castle Dunboyne (IE); Mark Delaney, Raleigh, NC (US); Ahmad Abdul Wakeel, Mulhuddart (IE)

(73) Assignee: International Business Machines Corporation, Armonk, NY (US)

( * ) Notice: Subject to any disclaimer, the term of this patent is extended or adjusted under 35 U.S.C. 154(b) by 150 days.

(21) Appl. No.: 15/991,283

(22) Filed: May 29, 2018

(65) Prior Publication Data
US 2019/0370401 A1    Dec. 5, 2019

(51) Int. Cl.
| G06F 16/00 | (2019.01) |
| G06F 16/9535 | (2019.01) |
| H04W 4/70 | (2018.01) |
| G06F 16/2457 | (2019.01) |
| G06F 16/9032 | (2019.01) |
| G06F 16/33 | (2019.01) |

(52) U.S. Cl.
CPC .... *G06F 16/9535* (2019.01); *G06F 16/24578* (2019.01); *G06F 16/90332* (2019.01); *H04W 4/70* (2018.02); *G06F 16/3344* (2019.01)

(58) Field of Classification Search
None
See application file for complete search history.

(56) References Cited

U.S. PATENT DOCUMENTS

| 2010/0299338 | A1 | 11/2010 | Aarni et al. |
| 2016/0135241 | A1 | 5/2016 | Gujral et al. |
| 2017/0026974 | A1* | 1/2017 | Dey ............. H04W 4/025 |
| 2017/0034700 | A1 | 2/2017 | Cohen et al. |
| 2017/0126834 | A1 | 5/2017 | Fransen |
| 2017/0262923 | A1 | 9/2017 | Bute et al. |
| 2017/0279682 | A1* | 9/2017 | Dawson ........... H04L 41/0893 |
| 2019/0147107 | A1* | 5/2019 | Wei ................. G06F 16/2433 |
| | | | 707/706 |
| 2019/0318037 | A1* | 10/2019 | Mishra .............. G06F 16/31 |

FOREIGN PATENT DOCUMENTS

| CN | 103425740 | 6/2016 |
| EP | 3244573 | 11/2017 |

\* cited by examiner

*Primary Examiner* — Bai D Vu
(74) *Attorney, Agent, or Firm* — Schmeiser, Olsen & Watts, LLP; Nicholas L. Cadmus

(57) ABSTRACT

A system and method for filtering search results to exclude technically incompatible devices with a user's existing IoT network includes analyzing the search query to determine an objective of a user, calculating a relevance score for each IoT device, profiling an existing IoT network associated with the user, determining a compatibility of each IoT device with the existing IoT network, combining the relevance score and an ease of incorporation score to determine a total score, and filtering the search results for the IoT devices according to the total score, such that an optimal device is displayed at a top of the search results from the search engine on a webpage among other IoT devices that are above a minimum ease of incorporation score and removing other IoT devices from the search results displayed on the webpage that are below the minimum ease of incorporation score.

20 Claims, 13 Drawing Sheets

|  | Raw Relevance Score | Confidence Factor | Relevance Score |
|---|---|---|---|
| Product 1 | 8 | 0.8 | 6.4 |
| Product 2 | 2 | 0.9 | 1.8 |
| Product 3 | 5 | 0.7 | 3.5 |
| Product 4 | 7 | 0.8 | 5.6 |
| Product 5 | 8 | 0.75 | 6 |
| Product 6 | 1 | 0.6 | 0.6 |
| Product 7 | 1 | 0.9 | 0.9 |
| Product 8 | 10 | 0.9 | 9 |
| Product 9 | 9 | 0.7 | 6.3 |
| Product 10 | 4 | 0.8 | 3.2 |

FIG. 3

|  | Connection Interface Type 1 | Connection Interface Type 2 | Connection Interface Type 3 | Connection Interface Type 4 | Connection Interface Type 5 |
|---|---|---|---|---|---|
| Product 1 |  |  | x |  |  |
| Product 2 | x |  |  |  |  |
| Product 3 |  |  |  | x |  |
| Product 4 |  | x |  |  |  |
| Product 5 |  | x |  |  |  |
| Product 6 |  |  |  | x |  |
| Product 7 | x |  |  |  |  |
| Product 8 |  |  |  | x |  |
| Product 9 | x | x | x |  | x |
| Product 10 |  |  |  |  | x |

FIG. 4

|  | Raw Ease of Introduction Score | Confidence Factor | Ease of Introduction Score |
|---|---|---|---|
| Product 1 | 6 | 0.8 | 4.8 |
| Product 2 | 7 | 0.9 | 6.3 |
| Product 3 | 1 | 0.7 | 0.7 |
| Product 4 | 7 | 0.75 | 5.25 |
| Product 5 | 8 | 0.8 | 6.4 |
| Product 6 | 1 | 0.6 | 0.6 |
| Product 7 | 8 | 0.9 | 7.2 |
| Product 8 | 1 | 0.9 | 0.9 |
| Product 9 | 10 | 0.7 | 7 |
| Product 10 | 4 | 0.9 | 3.6 |

FIG. 5

|  | Relevance Score | Ease of Introduction Score | Total Score |
|---|---|---|---|
| Product 1 | 6.4 | 4.8 | 11.2 |
| Product 2 | 1.8 | 6.3 | 8.1 |
| Product 3 | 3.5 | 0.7 | 4.2 |
| Product 4 | 5.6 | 5.25 | 10.85 |
| Product 5 | 6 | 6.4 | 12.4 |
| Product 6 | 0.6 | 0.6 | 1.2 |
| Product 7 | 0.9 | 7.2 | 8.1 |
| Product 8 | 9 | 0.9 | 9.9 |
| Product 9 | 6.3 | 7 | 13.3 |
| Product 10 | 3.2 | 3.6 | 6.8 |

FIG. 6

|            | Rank                       | Total Score |
|------------|----------------------------|-------------|
| Product 9  | 1                          | 13.3        |
| Product 5  | 2                          | 12.4        |
| Product 1  | 3                          | 11.2        |
| Product 4  | 4                          | 10.85       |
| Product 7  | 5                          | 8.1         |
| Product 2  | 6                          | 8.1         |
| Product 10 | 7                          | 6.8         |
| Product 3  | N/A – Technically Incompatible |         |
| Product 6  | N/A – Technically Incompatible |         |
| Product 8  | N/A – Technically Incompatible |         |

SEARCH ENGINE FILTER BASED ON USER IOT NETWORK

TECHNICAL FIELD

The present invention relates to systems and methods for filtering search results within a search engine, and more specifically the embodiments of a search engine filtering system for filtering search results based on a user search query for Internet-of-Things (IoT) devices to exclude technically incompatible devices with a user's existing IoT network.

BACKGROUND

New IoT devices are being manufactured and introduced into the marketplace to keep up with demand. Many of the new IoT devices entering the marketplace function using various wireless connection interfaces. For example, an IoT device may use Wi-Fi connectivity interface, while another IoT device may use a short-range communication interface. The emerging IoT devices can also be associated with many different products, which may or may not meet the needs of a user.

SUMMARY

An embodiment of the present invention relates to a method, and associated computer system and computer program product, for filtering search results based on a user search query for Internet-of-Things (IoT) devices to exclude technically incompatible devices with a user's existing IoT network. A processor of a computing system analyzes the search query input into a search engine to determine an objective of a user for searching the IoT devices. A relevance score is calculated for each IoT device present in the search results, based on the objective of the user. An existing IoT network associated with the user is profiled. A compatibility is determined of each IoT device with the existing IoT network associated with the user, wherein an ease of incorporation score is calculated based on the compatibility. The relevance score and the ease of incorporation score are combined to determine a total score. The search results for the IoT devices are filtered according to the total score, such that an optimal device is displayed at a top of the search results from the search engine on a webpage among other IoT devices that are above a minimum ease of incorporation score and removing other IoT devices from the search results displayed on the webpage that are below the minimum ease of incorporation score so that user does not view IoT devices that are not technically usable with the existing IoT network associated with the user.

BRIEF DESCRIPTION OF THE DRAWINGS

FIG. 3 depicts a table of calculated relevance scores for IoT devices returned in an initial search engine search of the user query, in view of the user's objective for searching IoT devices, in accordance with embodiments of the present invention.

FIG. 4 depicts a chart showing technical properties of multiple IoT devices, in accordance with embodiments of the present invention.

FIG. 5 depicts a table of calculated ease of incorporation scores for IoT devices returned in an initial search engine search of the user query, in view of the user's IoT network, in accordance with embodiments of the present invention.

FIG. 6 depicts a table of calculated total scores for IoT devices returned in an initial search engine search of the user query, in view of the user's objective and IoT network, in accordance with embodiments of the present invention.

FIG. 7 depicts a table of IoT devices returned in an initial search engine search of the user query and filtered based on a technical incompatibility with a user IoT network, in accordance with embodiments of the present invention.

DETAILED DESCRIPTION

IoT devices entering the marketplace have multiple wireless network interfaces, such as WIFI, BLUETOOTH, ZIGBEE, Z-WAVE, SIGNOX, NEUL, LOWRAWAN, and others. Searching the right IoT devices that not only meets the needs of a user, but is also compatible with a user's existing IoT network is a current problem with existing search engine technology. Embodiments of the present invention may bridge the gap between searching a IoT device in the market with an ability of a IoT device to be compatible with the user's existing IoT network. As a result, a search engine filtering system may order a display rank of IoT devices in a marketplace, such as search engine results, relative to user's intent, goal, objective, needs, etc. and the device's ease of incorporation into user's existing IoT network. The search engine filtering system may determine the user's intent or goal using a Natural Language Understanding (NLU) and shortlist the devices available in the marketplace that meets the needs of the user and the technical requirements of an existing IoT network. In some embodiments, the search engine system may filter the search results to exclude technically incompatible IoT devices from the search results. The search engine system may calculate a score that indicates how relevant to a particular device is when compared with the user intent, and derive an ease of incorporation from the device's compatibility with existing IoT network of devices relative to data transfer rate, type of data and connections interface type, etc. The search engine filtering system may combine a relevance score and an ease of incorporation score to calculate an cumulative score for determining an optimal device in marketplace relative to user's intent and existing IoT network, while filtering out results pertaining to IoT devices that are within a certain threshold of being technically incompatible with the user IoT network.

Embodiments of the present invention may improve upon existing search engine technology by filtering out IoT devices from appearing in search results that would not be technically compatible with the user's existing IoT network. By automatically filtering out results based on a technical compatibility reduces complication and ensures usability of the device for the consumer. Further, implementation of the present invention reduces product returns and disputes for a vendor and/or retailer. The improved search engine may also provide recommendations, suggestion, allowing for upsell opportunities for additional compatible devices and expanded IoT network functionality.

Figure 1:
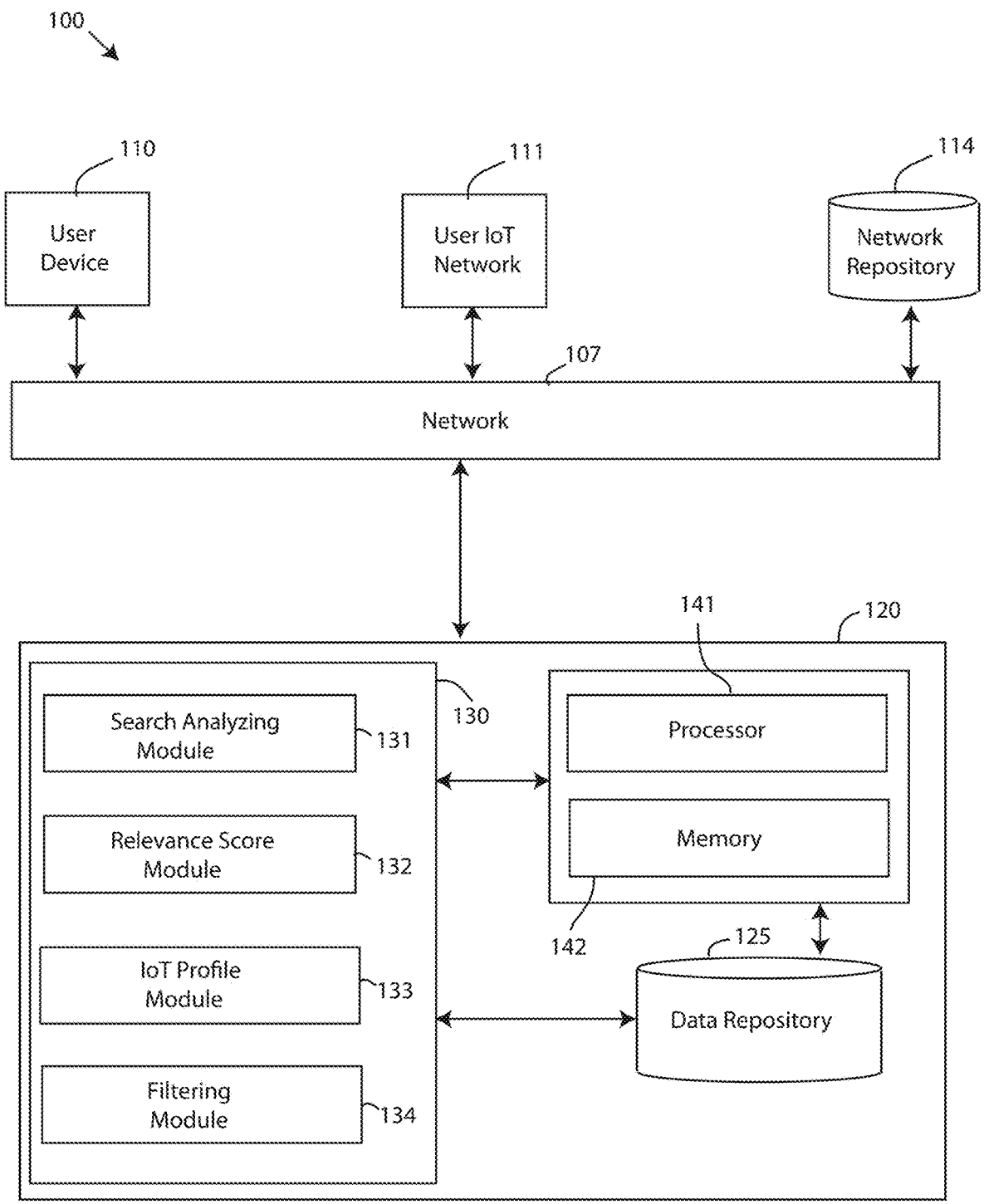
FIG. 1 depicts a block diagram of a search engine filter system, in accordance with embodiments of the present invention.

Referring to the drawings, FIG. 1 depicts a block diagram of a search engine filter system 100, in accordance with embodiments of the present invention. Embodiments of the search engine filter system 100 may be a system for filtering search results based on a user search query for Internet-of-Things (IoT) devices to exclude technically incompatible devices with a user's existing IoT network. Embodiments of the search engine filter system 100 may be useful for solving a problem relating to search engines retuning results for technically incompatible IoT devices based on user's needs and technical limitations and constraints. For example, the search engine filter system 100 may tailor/filter/individual search results from a user query to exclude incompatible devices, so that the search engine only returns results for optimal devices, which may also be ordered in accordance with an optimum fit for a user's needs and existing IoT network. Embodiments of the optimality system 100 may also decrease a decision time for the user because the user no longer needs to research whether the IoT device will be compatible with the user's IoT network, saving additional computer resources to further research the complicated technical details of IoT networks, connectivity interfaces, etc. Embodiments of a IoT device may be any physical object that may connect to the Internet using one or more connectivity interfaces. Exemplary embodiments of an IoT device may be a home automation device, a product reordering device, a doorbell camera, air quality sensor, virtual assistant, smart speaker, a light bulb, a light switch, air purifier, slow cooker, connected appliance, refrigerator, oven, security system, garage door opener, thermostat, locks, smoke and carbon dioxide detectors, and the like.

Embodiments of the search engine filter system 100 may be a search engine, a filter system, a search engine platform, a search results filtering system, an IoT technical compatibility system, and the like. Embodiments of the search engine filter system 100 may include a computing system 120. Embodiments of the computing system 120 may be a computer system, a computer, a server, one or more servers, a backend computing system, a search engine, a computing system powering a search engine, and the like.

Furthermore, embodiments of search engine filter system 100 may include a user device 110 and an IoT network 111 that are communicatively coupled to the computing system 120 over a network 107. For instance, information/data may be transmitted to and/or received from the user device 110 and the IoT network 111 over a network 107. A network 107 may be the cloud. Further embodiments of network 107 may refer to a group of two or more computer systems linked together. Network 107 may be any type of computer network known by individuals skilled in the art. Examples of network 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the network 107 may be a peer-to-peer network in some embodiments, wherein in other embodiments, the network 107 may be organized as a client/server architecture.

In some embodiments, the network 107 may further comprise, in addition to the computing system 120, a connection to one or more network-accessible knowledge bases 114, which are network repositories containing information of IoT devices, user search activity, search engine filtering options, network repositories or other systems connected to the network 107 that may be considered nodes of the network 107. In some embodiments, where the computing system 120 or network repositories allocate resources to be used by the other nodes of the network 107, the computing system 120 and network-accessible knowledge bases 114 may be referred to as servers.

The network-accessible knowledge bases 114 may be a data collection area on the network 107 which may back up and save all the data transmitted back and forth between the nodes of the network 107. For example, the network repository may be a data center saving and cataloging IoT network and device data, user's IoT devices, and the like, to generate both historical and predictive reports regarding a particular user IoT network, device list, search query, product needs, and the like. In some embodiments, a data collection center housing the network-accessible knowledge bases 114 may include an analytic module capable of analyzing each piece of data being stored by the network-accessible knowledge bases 114. Further, the computing system 120 may be integrated with or as a part of the data collection center housing the network-accessible knowledge bases 114. In some alternative embodiments, the network-accessible knowledge bases 114 may be a local repository that is connected to the computing system 120.

Embodiments of the user device 110 may be a computing device, a computer, a desktop computer, a cell phone, a mobile computing device, a tablet computer, a laptop computer, a wearable computing device, a smartwatch, and the like, which may be used to access and operate a search engine using a browser loaded on the user device 110. The user device 110 may include hardware functionality such as a speaker for emitting a sound, a vibration motor for creating vibrations, a display for displaying images, videos, pictorial sequences, etc., a light emitting element for emitting a light, a receiver for receiving communications, a transmitter for transmitting signals, and other similar features and hardware of a computer, smartphone, smartwatch, cell phone, tablet computer, and the like.

Referring still to FIG. 1, embodiments of the search engine filter system 100 may include an IoT network 111. Embodiments of the IoT network 111 may be a network system configuration and/or network architecture associated with the user or with the user's job, business, land, municipality, grid, etc. For example, the IoT network 111 may be a home network, a commercial network, manufacturing floors, energy grids, transportation, and vehicle-to-vehicle network, and the like, which may support various connectivity interfaces, security protocols, network protocols, etc. used in connection with IoT devices within the IoT network 111. The IoT network 111 may have various technical specifications and capabilities, such as support for one or more connectivity interfaces, available bandwidth, a number of routers, a number of access points, a number of existing IoT devices, a number of existing streaming devices, a power availability, a number of connections, a cost per connection, a scalability, existence of remote devices, a data transfer viability for upstream and downstream, reliability, a latency, a customization level, a number of zones, and the like. Embodiments of the IoT network 111 may not be technically compatible with some IoT devices within the marketplace, for various reasons, including . . . .

Furthermore, embodiments of the computing system 120 of the search engine filter system 100 may be equipped with a memory device 142 which may store various data/information/code, and a processor 141 for implementing the tasks associated with the search engine filtering system 100. In some embodiments, a search engine filtering application 130 may be loaded in the memory device 142 of the computing system 120. Embodiments of the search engine filtering application 130 may be an interface, an application, a program, a module, or a combination of modules. In an exemplary embodiment, the search engine filtering application 130 may be a software application running on one or more back end servers, search engines, etc. servicing one or more user devices 110, wherein a user interface portion of the software application (e.g. a search engine application) may also run on the user device 110.

The search engine filtering application 130 of the computing system 120 may include a search analyzing module 131, a relevance score module 132, an IoT profile module 133, and a filtering modification module 134. A "module" may refer to a hardware-based module, software-based module or a module may be a combination of hardware and software. Embodiments of hardware-based modules may include self-contained components such as chipsets, specialized circuitry and one or more memory devices, while a software-based module may be part of a program code or linked to the program code containing specific programmed instructions, which may be loaded in the memory device of the computing system 120. A module (whether hardware, software, or a combination thereof) may be designed to implement or execute one or more particular functions or routines.

Embodiments of the search analyzing module 131 may include one or more components of hardware and/or software program code for analyzing a search query input into a search engine to determine an objective of a user for searching the IoT devices. For instance, the search analyzing module 131 may, in response to detecting that a user is typing a search query into a search engine user interface on the user device 110, or in real-time as the user is typing the search query, analyze a content of the search query to determine an intent, a need, a goal, an objective, a plan, and the like, of a user with respect to IoT devices. For example, the search analyzing module 131 may parse the search query to determine which type of IoT device the user is searching for, a reason for searching for the particular IoT device, a location for the IoT device, a problem the user faces with the current device, a type of environment hosting the IoT device, an intended installation location, a performance of the IoT device, and the like. The content of the search query may be analyzed by a text analysis system that may parse, identify, etc. words using, for example, a natural language processing technique, a natural language understanding technique, etc. to analyze the content (e.g. words) of the search query.

Figure 2:
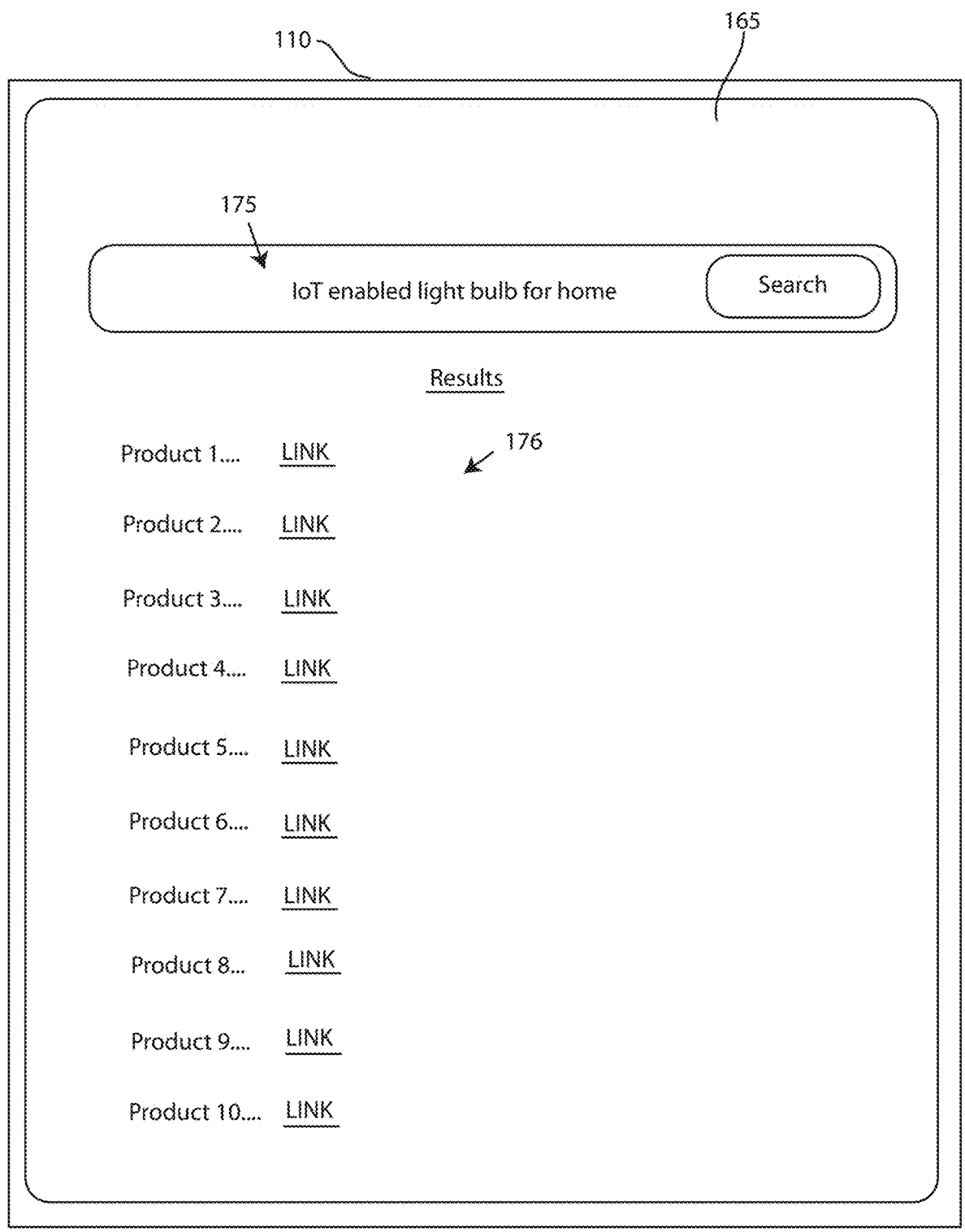
FIG. 2 depicts a graphical user interface of the user device showing unfiltered search results from a search query for an IoT device, in accordance with embodiments of the present invention.

A graphical user interface of a search engine application loaded on the user device 110 may display the text as the user types or otherwise inputs (e.g. voice-to text, virtual assistant, etc.) the search query. In prior systems, the search query may be processed, and a number of search results may be displayed to the user as a function of the search engine processing the search query. FIG. 2 depicts a graphical user interface (GUI) 165 of the user device 110 showing unfiltered search results 176 from a search query 175 for an IoT device, in accordance with embodiments of the present invention. Here, the user has entered a search query 175 that states "IoT enabled light bulb for home." Traditionally, the search engine would process the search query, fetch various websites, organize the websites according to various search algorithms, and then display the results 176 with links for the user to access the webpage, as shown in FIG. 2. However, as an improvement to existing search engine capabilities, the search analyzing module 131 may analyzing the search query 175 input into the search engine to determine an objective of a user for searching the IoT devices, for calculation of a relevance score, as described in greater detail infra.

Referring still to FIG. 1 embodiments of the computing system 120 may include a relevance score module 132. Embodiments of the relevance score module 132 may include one or more components of hardware and/or software program code for calculating a relevance score for each IoT device present in the search results, based on the objective of the user. For instance, the relevance score module 132 may determine whether an IoT device returned in an initial search result is relevant, and a degree of relevance, to the user's objective (e.g. intent, needs, goals, etc.). Embodiments of the relevance score module 132 may analyze, parse, scan, search, inspect, crawl, etc. a website or other information source available over the Internet for a context, feature, use, technical specification, information, and the like that correlates or otherwise relates to or is otherwise consistent with the user's objective for searching for IoT devices. Embodiments of the relevance score module 132 may use a combination of natural language processing and understanding techniques, cognitive applications/engines, and visual recognition engines to determine a context, content, and relevancy of the IoT devices within the search engine results for comparison with the user's objective, as determined by the search analyzing module 131.

Moreover, embodiments of the relevance score module 132 may compare the context, features, information, and content from the website(s) containing IoT device information with the content of the user search query. For instance, keywords, texts, insights, or other acquired computer readable information associated with the IoT website(s) and other IoT device-specific sources of information may be compared with keywords, texts, insights, or other computer readable information associated with the user's objective (e.g. a type of IoT device, a function of the IoT device, a location of the IoT device, etc.). Based on the comparison, the relevance score module 132 may determine that a particular IoT device may be relevant or otherwise correlate to the user's objective. In an exemplary embodiment, the relevance score module 132 may determine from following a link in the search results, that the IoT device (e.g. Product 1) is smart light bulb, which can be used in home and commercial environments. The relevance score module 132 may determine that Product 1 is relevant to the user's objective. In the example shown in FIG. 2, a list of IoT devices (i.e. Product 1-10) and associated links may be captured in an initial search engine process. As an improvement to existing search engine capabilities, the relevance score module 132 may calculate a relevance score for each or some of the Products 1-10 returned in the initial search results.

FIG. 3 depicts a table of calculated relevance scores for IoT devices returned in an initial search engine search of the user query, in view of the user's objective for searching IoT devices, in accordance with embodiments of the present invention. First, the relevance score module 132 may calculate a raw relevance score for Products 1-10, as shown in the second column. The relevance between the Products 1-10 (e.g. IoT device) to the user's objective may be output as a numerical value, such as a metric score or rating. The relevance score may be defined within a predefined range, such as 0-1, 0-10, 0-100, and the like. The more similarities between the Products 1-10 and the user's objective, the higher the relevance score. For instance, Products 8 and 9 have the highest relevant score, which means that Products 8 and 9 contain the most features relevant to the user's objective; Products 8 and 9 may be marketed as a genuine IoT light bulb for home use only, which is highly relevant to the user's objective to locate an IoT light bulb for the user's home. Other IoT devices, such as Products 1, 4, and 5 may have a high relevance score because Products 1, 4, and 5 may be marketed as IoT light bulbs for both home and commercial use, but more expensive then Products 8 and 9 because Products 1, 4, and 5 are ruggedized for commercial applications. The remaining Products 2, 3, 6, 7, and 10 may have a lower relevance score because Products 2, 3, 6, 7, and 10 may not be recommended for home use, may not connect to the Internet, may only connect to a smartphone via a shortrange communication network, such as BLUETOOTH, and the like.

Moreover, embodiments of the relevance score module 132 may apply a confidence factor to the raw relevance scores of Products 1-10. The confidence factor may be a numerical value representing a confidence in the calculation of the raw relevance score. The confidence factor may be based on a number of information sources found discussing the IoT device, a trustworthiness of a source discussing the IoT device, a degree of technical detail found in the sources, an amount of detail in the user search query, a length of the user search query, an accuracy of the terms used in the search query, and the like. The confidence factor may be used to modify the raw relevance score to derive a relevance score. For example, the confidence score may be multiplied with the raw relevance score to derive the relevance score.

Referring back to FIG. 1, embodiments of the computing system 120 may include an IoT profile module 133. Embodiments of the IoT profile module 133 may include one or more components of hardware and/or software program for profiling an existing IoT network associated with the user. For instance, the IoT profile module 133 may analyze the IoT network 111 associated with the user to build an IoT profile of the user's IoT network 111. Embodiments of the IoT profile module 133 may analyze the IoT network 111 to determine a plurality of technical properties of the IoT network 111 for a technical comparison with the IoT devices returned in the search results. Embodiments of the technical properties or factors of the IoT network 111 may be properties, technical specifications, protocols, standards, capabilities, capacities, IT architectures, a number of existing IoT devices, a number of connected devices to the network, a data rate, a data transfer viability, a supported connectivity interface, an unsupported connectivity interface, a type of data supported, a scalability, an environment of the IoT network 111, and the like. The IoT profile module 133 may obtain the technical properties from the IoT network 111 from the user. For example, the IoT profile module 133 may present the user with a plurality of questions regarding the IoT network 111 to obtain answers pertaining to the IoT network 111, or may send a request to the user to provide a description of the IoT network 111, which may be parsed, analyzed, or otherwise reviewed to extract keywords that may be used to draw conclusions regarding the technical. In other embodiments, the IoT profile module 133 may obtain the technical properties of the IoT network 111 . . . .

Embodiments of the IoT profile module 133 may utilize the technical properties of the IoT network 111 to build a profile to be used for determining a compatibility with the IoT devices returned in an initial search. For instance, embodiments of the IoT profile module 133 determine a compatibility of each IoT device with the existing IoT network associated with the user, wherein an ease of incorporation score is calculated based on the compatibility. In exemplary embodiments, the compatibility or ease of incorporation score is determined only for IoT devices that exceed a minimum relevance score, to save processing power on determining the compatibility of each IoT device. For example, if the relevance score for an IoT device is below a minimum threshold relevance, the IoT profile module 133 may remove the IoT device from the search results, or disable links to the IoT device. The ease of incorporation score may refer to a degree of technical compatibility of the IoT devices returned in the search with the IoT network 111. The ease of incorporation score may also refer to a degree of difficulty the user will have integrating the IoT device into the IoT network 111. Various technical properties of the IoT network 111 obtained as a function of the profiling the IoT network 111 may be compared with the technical features and characteristics of the IoT devices to derive an ease of incorporation score. In a first exemplary embodiment, a single technical property may be used in the comparison. In a second exemplary embodiment, a plurality of technical properties may be used in the comparison.

FIG. 4 depicts a chart showing technical properties of multiple IoT devices, in accordance with embodiments of the present invention. The chart may be for illustrative purposes, as the IoT profile module 133 may evaluate and filter out the technical features IoT devices algorithmically. In FIG. 4, embodiments of the IoT profile module 133 may determine which connection interface types are used for integrating/incorporating the Products 1-10 into the IoT network 111. The Products 1-10 may be associated with a single connection interface type (e.g. Connection Interface Type 1-5) or may be associated with multiple connection interface types. Examples of connection interface types associated with IoT devices may be wireless network interfaces such as WIFI, BLUETOOTH, ZIGBEE, Z-WAVE, SIGNOX, NEUL, LOWRAWAN, and others. As shown in FIG. 4, Product 1 operates with Connection Interface Type 1, Product 2 operates with Connection Interface Type 1, Product 3 operates with Connection Interface Type 4, Product 4 operates with Connection Interface Type 2, Product 5 operates with Connection Interface Type 2, Product 6 operates with Connection Interface Type 4, Product 7 operates with Connection Interface Type 1, Product 8 operates with Connection Interface Type 4, Product 9 operates with Connection Interface Types 1, 2, 3, and 5, and Product 10 operates with Connection Interface Type 5. With this information, the IoT profile module 133 may be able to calculate an ease of incorporation score.

FIG. 5 depicts a table of calculated ease of incorporation scores for IoT devices returned in an initial search engine search of the user query, in view of the user's IoT network, in accordance with embodiments of the present invention. The ease of incorporation score may be calculated based on a difficulty of incorporating the IoT device into the IoT network 111. In the example shown in FIG. 4, some connection interface types may be fully technically compatible with the existing IoT network 111, some connection interface types may be partly compatible but require a moderate amount of adjustment to the IoT network 111, some connection interface types may be partly compatible but require a significant amount of adjustment to the IoT network 111, and some connection interfaces may be fully technically incompatible. Products having a connection interface type fully compatible are given a high raw ease of incorporation score (e.g. 8-10), Products having a connection interface type partly compatible but requiring moderate adjustments are given a relatively high raw ease of incorporation score (e.g. 6-7), Products having a connection interface type partly compatible but requiring significant adjustments is given an average to low raw ease of incorporation score (e.g. 3-5), and Products having a connection interface type fully incompatible are given a very low raw ease of incorporation score (e.g. 1-2). The raw ease of incorporation score calculation shown in FIG. 4 takes into account connection interface types, but additional technical properties of the IoT devices and the IoT network 111 as described above may be used for calculating the raw ease of incorporation score. For example, a number of existing devices integrated on the IoT network 111 and an overall bandwidth may affect the raw ease of incorporation score based on a data rate consumption of the IoT device.

Moreover, embodiments of the IoT profile module 133 may apply a confidence factor to the raw ease of incorporation scores of Products 1-10. The confidence factor may be a numerical value representing a confidence in the calculation of the raw ease of incorporation score. The confidence factor may be based an amount of detail in the user description of the IoT network 111, a length of the user description of the IoT network 111, a completeness of a questionnaire sent to the user regarding technical properties of the IoT network 111, an accuracy in deriving the technical features of the IoT devices, and the like. The confidence factor may be used to modify the raw ease of incorporation score to derive an ease of incorporation score. For example, the confidence score may be multiplied with the raw ease of incorporation score to derive the ease of incorporation score.

Embodiments of the IoT profile module 133 may combine the relevance score and the ease of incorporation score to determine a total score. A total score may be a sum or cumulative score between the relevance score and the ease of incorporation score. FIG. 6 depicts a table of calculated total scores for IoT devices returned in an initial search engine search of the user query, in view of the user's objective and IoT network, in accordance with embodiments of the present invention.

Figure 8:
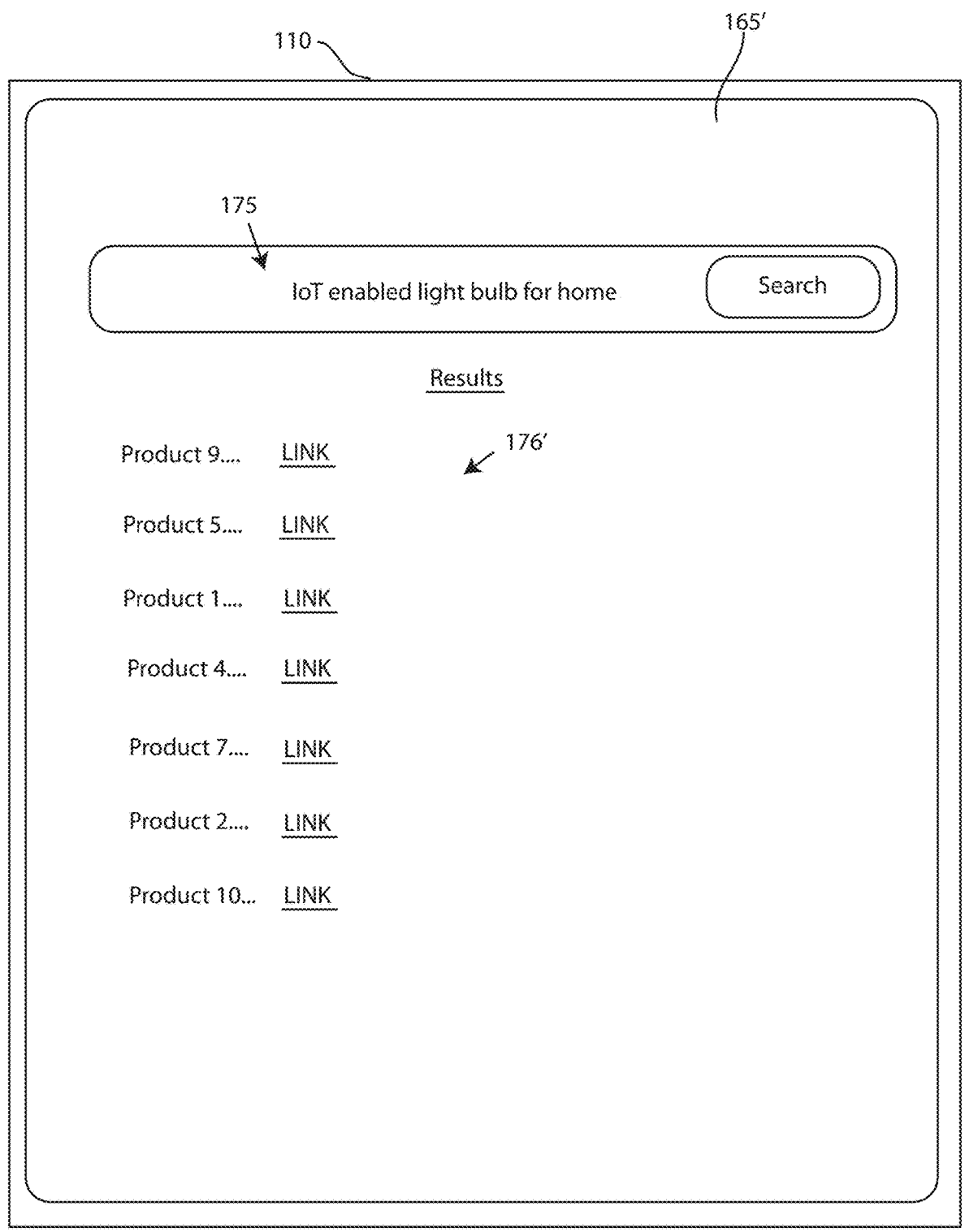
FIG. 8 depicts a modified graphical user interface of the user device of FIG. 2 showing filtered search results from the search query for an IoT device, in accordance with embodiments of the present invention.
Figure 9:
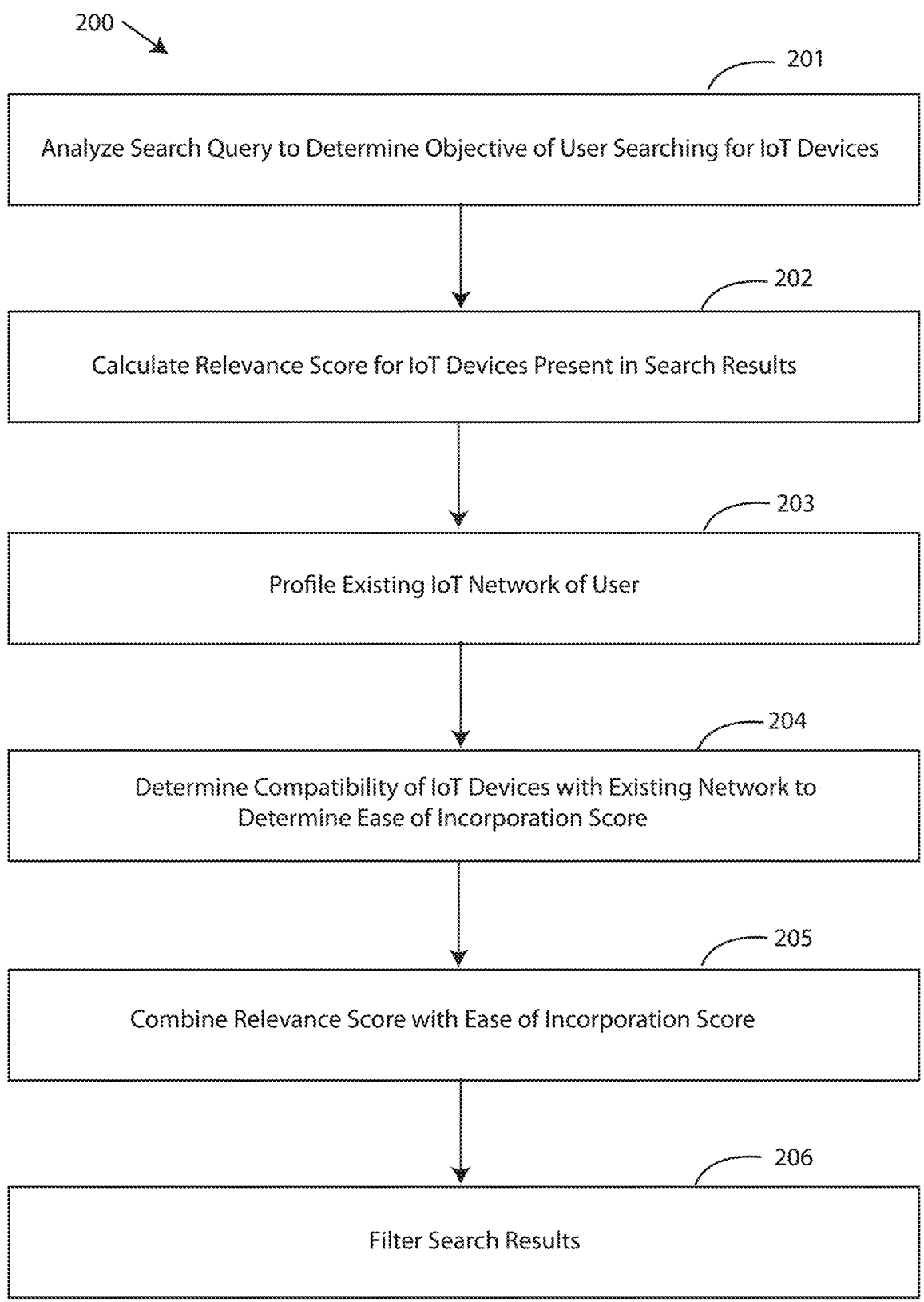
FIG. 9 depicts a flow chart of a method for filtering search results based on a user search query for Internet-of-Things (IoT) devices to exclude technically incompatible devices with a user's existing IoT network, in accordance with embodiments of the present invention.

Referring back to FIG. 1, embodiments of the computing system 120 may include a filtering module 134. Embodiments of the filtering module 134 may include one or more components of hardware and/or software program for filtering the search results for the IoT devices according to the total score. For instance, embodiments of the filtering module 134 may filter the search results to take into account both and an objective of a user and a technically compatibility, such that the filtering module 134 may intentionally remove results that do not exceed a minimum total score and/or a minimum ease of incorporation score. The minimum ease of incorporation may be a range or set number that, if an IoT device is scored with an ease of incorporation score below the minimum, the filtering module 134 may remove the result from even appearing on the webpage of the browser of the user device 110. FIG. 7 depicts a table of IoT devices returned in an initial search engine search of the user query and filtered based on a technical incompatibility with a user IoT network, in accordance with embodiments of the present invention. As shown in FIG. 7, the filtering module 134 has filtered out Product 3, Product 6, and Product 8 because Product 3, Product 6, and Product 8 received an ease of incorporation score below a minimum threshold (e.g. ≥1). Product 3, Product 6, and Product 8 have been determined to be fully technically incompatible with the user's existing IoT network 111 and are thus filtered out in a manner that the search engine running search engine filtering application 130 may not display or otherwise present the results pertaining to Product 3, Product 6, and Product 8. Rather, embodiments of the filtering module 134 may display an optimal device at a top of the search results from the search engine on the webpage among other IoT devices that are above a minimum ease of incorporation score and removing other IoT devices from the search results displayed on the webpage that are below the minimum ease of incorporation score so that user does not view IoT devices that are not technically usable with the existing IoT network associated with the user. FIG. 8 depicts a modified graphical user interface 165' of the user device 110 of FIG. 2 showing filtered search results 176' from the search query 175 for an IoT device, in accordance with embodiments of the present invention. As shown in FIG. 9, several IoT devices, or links to websites to purchase the IoT device, have been filtered and removed so that the user is unable to select visually see the links to the technically incompatible IoT devices. Additionally, the IoT devices have been ranked and displayed in order of rank based on a total score calculated by the computing system 120. For example, Product 9 is displayed at the top of the results 176' because Product 9 has the highest total score, which takes into account a user objective and an ease of incorporation into the user's existing IoT network 111. Product 8, which had a high total score due to a very high relevance to the user's objective, has been removed because Product 8 is technically incompatible with the existing IoT network 111 (e.g. ease of incorporation score was below a required minimum ease of incorporation score). Accordingly, reordering the IoT devices and removing the technically incompatible IoT devices may include augmenting a graphical user interface 165 of a user computing device 110 to change an appearance of the graphical user interface 165' to improve a user purchase decision for user.

In alternative embodiments, instead of removing the links from being displayed within the browser, the links may be shown but disabled so that the user knows other IoT devices came up in the user search query 175, but have been determined to be technically incompatible. Further, embodiments of the filtering module 134 may present the removed IoT devices in a separate window along with one or more reasons why the removed IoT device is technically incompatible with the existing IoT network associated with the user, so that the user can decide whether to independently research the technically incompatible IoT device, or investigate making changes to the existing IoT network 111 to allow the technically incompatible IoT device to become technically compatible. In the separate window, the search engine filtering application 130 may insert links to IT professionals, IoT network equipment manufacturers, retailers, etc. that may help the user modify, change, and/or update the existing IoT network 111.

Various tasks and specific functions of the modules of the computing system 120 may be performed by additional modules, or may be combined into other module(s) to reduce the number of modules. Further, embodiments of the computer or computer system 120 may comprise specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry may include proprietary specially designed components (e.g., a specialized integrated circuit, such as for example an Application Specific Integrated Circuit (ASIC), designed for only implementing methods of the present invention). Moreover, embodiments of the search engine filtering system 100 improves existing search engine technology by filtering out technically incompatible IoT devices based on a technical compatibility of an existing IoT network. Prior search engines do not intentionally delete results or disable links based on a technical compatibility with a product being searched and an existing network architecture. Without the link being present in the search results, the user will not be able to follow a link to make an eventual purchase of a device that will not be technically compatible with the user's existing IoT network. This reduces product returns and promotes technical harmony between newly purchased IoT devices and the IoT network. Furthermore, by filtering out the technically incompatible IoT devices or links associated therewith, the webpage of the user's browser changes in appearance when using search engine filtering application 130. For example, search engine filtering system 100 may transform a GUI on a mobile device or other user device of a browser to eliminate mistake in user purchases of technically incompatible IoT devices.

Furthermore, the search engine filtering system 100 improves search engines by solving the problem of presenting IoT devices that are not technically compatible on a browser for a user to purchase. Without altering the GUI and filtering the initial search results, the wrong devices are presented to the user. Embodiments of the search engine filtering system 100 provides a technical solution to the above-drawbacks by altering or otherwise augmenting the GUI and filtering the search results to remove links to products a particular user should not purchase based on an existing IoT network. The technical solution(s) described herein is necessarily rooted in computer technology in order to overcome a problem specifically arising in the realm of search engines and search result filtering, based on a technical compatibility of a network.

Referring now to FIG. 9, which depicts a flow chart of a method 200 for filtering search results based on a user search query for IoT devices to exclude technically incompatible devices with a user's existing IoT network, in accordance with embodiments of the present invention. One embodiment of a method 200 or algorithm that may be implemented for filtering search results based on a user search query for IoT devices to exclude technically incompatible devices with a user's existing IoT network with the search engine filtering system 100 described in FIGS. 1-8 using one or more computer systems as defined generically in FIG. 11 below, and more specifically by the specific embodiments of FIG. 1.

Embodiments of the method 200 for filtering search results based on a user search query for IoT devices to exclude technically incompatible devices with a user's existing IoT network, in accordance with embodiments of the present invention, may begin at step 201 wherein a search query is analyzed to determine an objective of a user searching for IoT devices using a search engine. Step 202 calculates a relevance score for IoT devices present in the search results, in view of the user's objective. Step 203 profiles an existing IoT network associated with the user. Step 204 determines compatibility of IoT devices with the existing IoT network to determine an ease or incorporation score. Step 205 combines the relevance score with the ease of incorporation score to derive a cumulative total score. Step 206 filters the search results.

Figure 10:
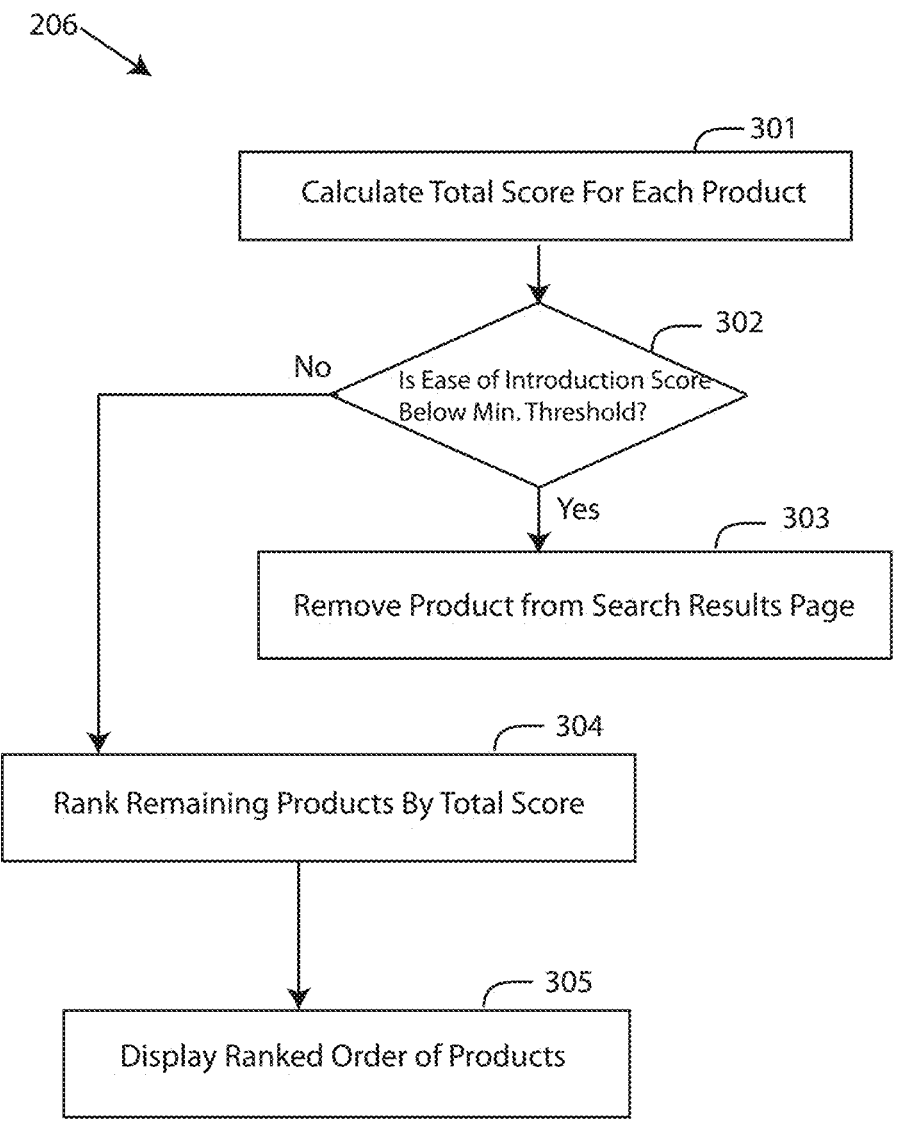
FIG. 10 depicts a flow chart of a step of the method of FIG. 9 for filtering search results based on a user search query for IoT devices to exclude technically incompatible devices with a user's existing IoT network, in accordance with embodiments of the present invention.

FIG. 10 depicts a flow chart of a step 206 of the method 200 of FIG. 9 for filtering search results based on a user search query for IoT devices to exclude technically incompatible devices with a user's existing IoT network, in accordance with embodiments of the present invention. Step 301 calculates a total score for each product. Step 203 determines whether the ease of incorporation score is below a minimum threshold. If yes, the IoT device or links associated therewith are removed the search results webpage. If no, then step 304 ranks the remaining IoT devices by the calculated total score. Step 305 displays the ranked order of IoT devices, in accordance with the total score, after products having a minimum ease of incorporation score have been removed.

Figure 11:
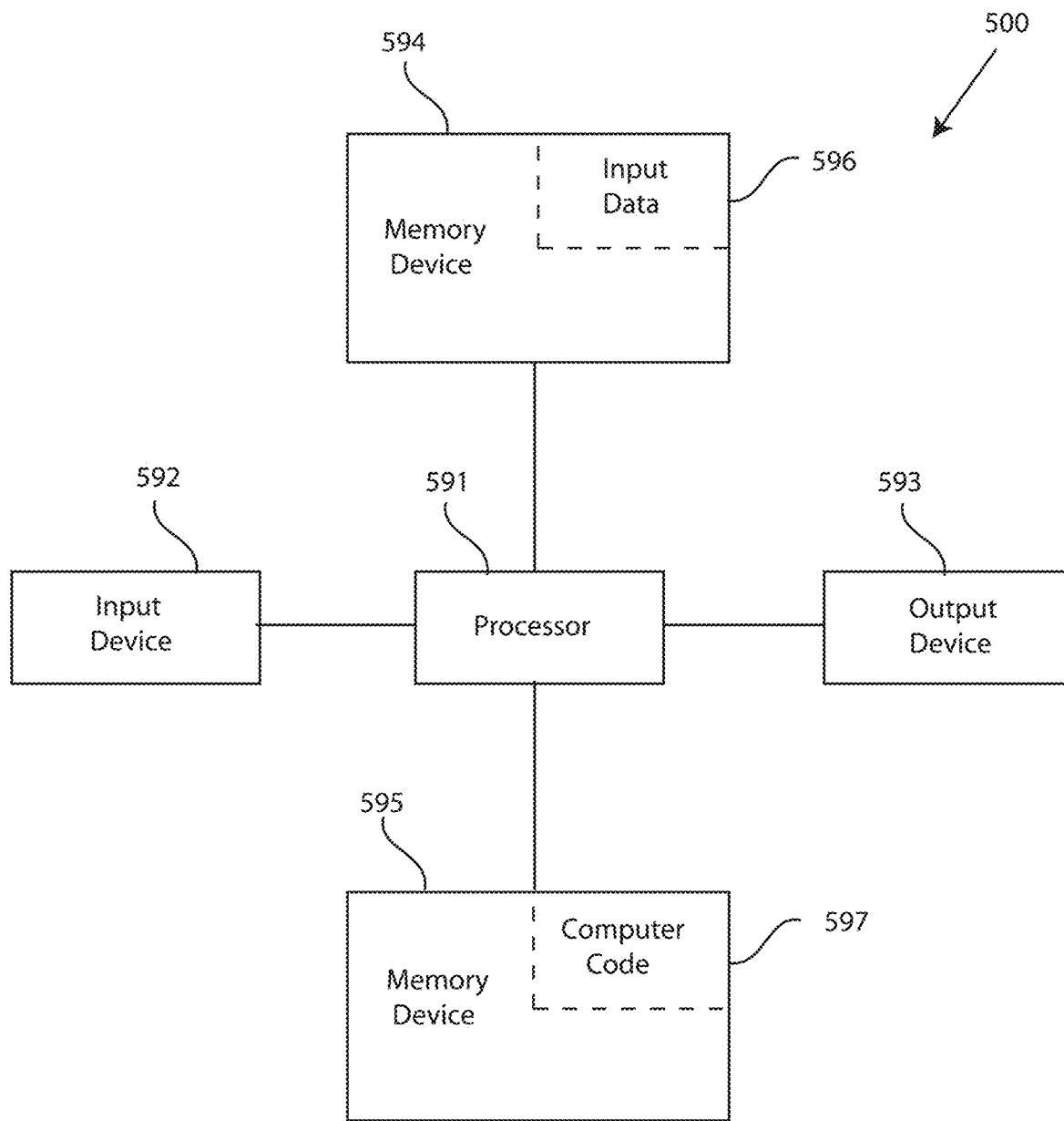
FIG. 11 depicts a block diagram of a computer system for the search engine filtering system of FIGS. 1-8, capable of implementing for filtering search results based on a user search query for Internet-of-Things (IoT) devices to exclude technically incompatible devices with a user's existing IoT network of FIGS. 9-10, in accordance with embodiments of the present invention.

FIG. 11 depicts a block diagram of a computer system for the search engine filtering system 100 of FIGS. 1-8, capable of implementing methods for filtering search results based on a user search query for IoT devices to exclude technically incompatible devices with a user's existing IoT network of FIGS. 9-10, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for filtering search results based on a user search query for IoT devices to exclude technically incompatible devices with a user's existing IoT network in the manner prescribed by the embodiments of FIGS. 9-10 using the search engine filtering system 100 of FIGS. 1-8, wherein the instructions of the computer code 597 may be executed by processor 591 via memory device 595. The computer code 597 may include software or program instructions that may implement one or more algorithms for implementing the method for filtering search results based on a user search query for IoT devices to exclude technically incompatible devices with a user's existing IoT network, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 11.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to search engine filtering systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor(s) 591, wherein the processor(s) carry out instructions contained in the computer code 597 causing the computer system to filter search results based on a user search query for IoT devices to exclude technically incompatible devices with a user's existing IoT network. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a method for filtering search results based on a user search query for IoT devices to exclude technically incompatible devices with a user's existing IoT network. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for filtering search results based on a user search query for IoT devices to exclude technically incompatible devices with a user's existing IoT network.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
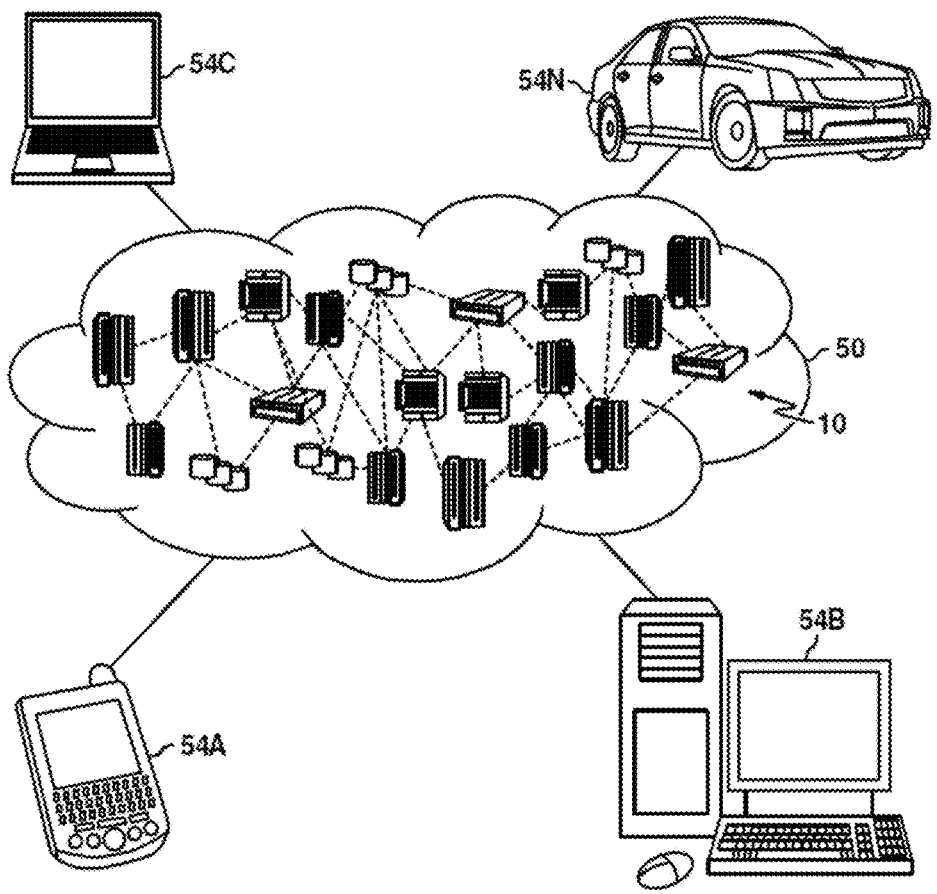
FIG. 12 depicts a cloud computing environment, in accordance with embodiments of the present invention.

Referring now to FIG. 12, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 12 are intended to be illustrative only and that computing nodes 10 and cloud computing environment 50 can communicate with any type of computerized device over any type of network and/or network addressable connection (e.g., using a web browser).

Figure 13:
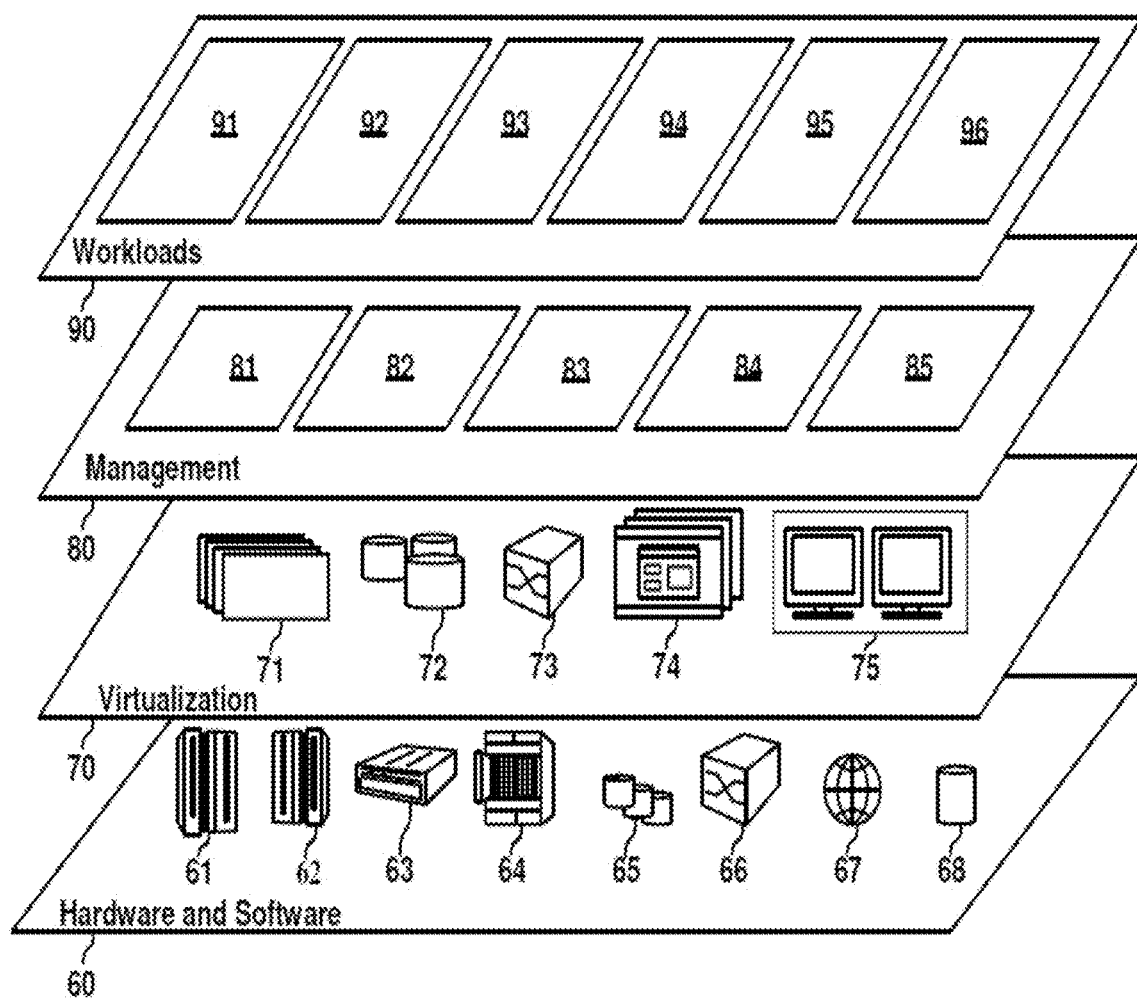
FIG. 13 depicts abstraction model layers, in accordance with embodiments of the present invention.

Referring now to FIG. 13, a set of functional abstraction layers provided by cloud computing environment 50 (see FIG. 12) are shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and GUI and search engine filters 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for filtering search results based on a user search query for Internet-of-Things (IoT) devices to exclude technically incompatible devices with a user's existing IoT network, the method comprising:
   analyzing, by a processor of a computing system, the search query input into a search engine to determine an objective of a user for searching the IoT devices;
   calculating, by the processor, a relevance score for each IoT device present in the search results, based on the objective of the user;
   building, by the processor, an IoT profile by analyzing an existing IoT network associated with the user the IoT profile containing technical properties of the existing IoT network;
   determining, by the processor, a compatibility of each IoT device with the existing IoT network associated with the user using the IoT profile, wherein an ease of incorporation score is calculated based on the compatibility;
   combining, by the processor, the relevance score and the ease of incorporation score to determine a total score;
   filtering, by the processor, the search results for the IoT devices according to the total score; and
   displaying, by the processor, an optimal device at a top of the search results from the search engine on a webpage among other IoT devices that are above a minimum ease of incorporation score and removing other IoT devices from the search results displayed on the webpage that are below the minimum ease of incorporation score so that IoT devices that are not technically usable with the existing IoT network associated with the user are not displayed.

2. The method of claim 1, wherein the objective of the user is at least one of an intent and goal of a user for searching the IoT devices, determined by using a natural language understanding processing technique.

3. The method of claim 1, wherein the determining the compatibility of each IoT device includes comparing, by the processor, one or more IoT network factors of the existing IoT network with one or more features of the IoT device.

4. The method of claim 3, wherein the one or more IoT network factors include a supported wireless connectivity interface, an unsupported wireless connectivity, a data transfer rate, a number of existing IoT devices within the existing IoT network, a type of each existing IoT device within the existing IoT network, a supported encryption protocol, and a data type, a protocol, a standard, an IT architecture, a number of devices connected to the network, a data transfer viability, a scalability, and an environment of the IoT network.

5. The method of claim 1, wherein the compatibility is determined only for IoT devices that exceed a minimum relevance score to save processing power on determining the compatibility of each IoT device.

6. The method of claim 1, further comprising: presenting, by the processor, the removed IoT devices in a separate window along with one or more reasons why the removed IoT device is technically incompatible with the existing IoT network associated with the user.

7. The method of claim 1, wherein the reordering the IoT devices and removing the technically incompatible IoT devices includes augmenting a graphical user interface of a user computing device to change an appearance of the graphical user interface to improve a user purchase decision for user.

8. A computing system, comprising:
   a processor;
   a memory device coupled to the processor; and
   a computer readable storage device coupled to the processor, wherein the storage device contains program code executable by the processor via the memory device to implement a method for filtering search results based on a user search query for Internet-of-Things (IoT) devices to exclude technically incompatible devices with a user's existing IoT network, the method comprising:
      analyzing, by a processor of a computing system, the search query input into a search engine to determine an objective of a user for searching the IoT devices;
      calculating, by the processor, a relevance score for each IoT device present in the search results, based on the objective of the user;
      building, by the processor, an IoT profile by analyzing an existing IoT network associated with the user, the IoT profile containing technical properties of the existing IoT network;
      determining, by the processor, a compatibility of each IoT device with the existing IoT network associated with the user using the IoT profile, wherein an ease of incorporation score is calculated based on the compatibility;
      combining, by the processor, the relevance score and the ease of incorporation score to determine a total score;
      filtering, by the processor, the search results for the IoT devices according to the total score; and
      displaying, by the processor, an optimal device at a top of the search results from the search engine on a webpage among other IoT devices that are above a minimum ease of incorporation score and removing other IoT devices from the search results displayed on the webpage that are below the minimum ease of incorporation score so that IoT devices that are not technically usable with the existing IoT network associated with the user are not displayed.

9. The computer system of claim 8, wherein the objective of the user is at least one of an intent and goal of a user for searching the IoT devices, determined by using a natural language understanding processing technique.

10. The computer system of claim 8, wherein the determining the compatibility of each IoT device includes comparing, by the processor, one or more IoT network factors of the existing IoT network with one or more features of the IoT device.

11. The computer system of claim 10, wherein the one or more IoT network factors include a supported wireless connectivity interface, an unsupported wireless connectivity, a data transfer rate, a number of existing IoT devices within the existing IoT network, a type of each existing IoT device within the existing IoT network, a supported encryption protocol, and a data type, a protocol, a standard, an IT architecture, a number of devices connected to the network, a data transfer viability, a scalability, and an environment of the IoT network.

12. The computer system of claim 8, wherein the compatibility is determined only for IoT devices that exceed a minimum relevance score to save processing power on determining the compatibility of each IoT device.

13. The computer system of claim 8, further comprising: presenting, by the processor, the removed IoT devices in a separate window along with one or more reasons why the removed IoT device is technically incompatible with the existing IoT network associated with the user.

14. The computer system of claim 8, wherein the reordering the IoT devices and removing the technically incompatible IoT devices includes augmenting a graphical user interface of a user computing device to change an appearance of the graphical user interface to improve a user purchase decision for user.

15. A computer program product, comprising a computer-readable hardware storage device storing a computer readable program code, the computer readable program code comprising an algorithm that when executed by a computer processor of a computing system implements a method for filtering search results based on a user search query for Internet-of-Things (IoT) devices to exclude technically incompatible devices with a user's existing IoT network, the method comprising:

analyzing; by a processor of a computing system, the search query input into a search engine to determine an objective of a user for searching the IoT devices;

calculating, by the processor, a relevance score for each IoT device present in the search results, based on the objective of the user;

building, by the processor, an IoT profile by analyzing an existing IoT network associated with the user, the IoT profile containing technical properties, of the existing IoT network;

determining, by the processor, a compatibility of each IoT device with the existing IoT network associated with the user using the IoT profile, wherein an ease of incorporation score is calculated based on the compatibility;

combining, by the processor, the relevance score and the ease of incorporation score to determine a total score;

filtering, by the processor, the search results for the IoT devices according to the total score; and displaying, by the processor, an optimal device at a top of the search results from the search engine on a webpage among other IoT devices that are above a minimum ease of incorporation score and removing other IoT devices from the search results displayed on the webpage that are below the minimum ease of incorporation score so that IoT devices that a not technically usable with the existing IoT network associated with the user are not displayed.

16. The computer program product of claim 15, wherein the determining the compatibility of each device includes comparing, by the processor, one or more IoT network factors of the existing IoT network with one or more features of the IoT device.

17. The computer program product of claim 16, wherein the one or more IoT network factors include a supported wireless connectivity interface, an unsupported wireless connectivity, a data transfer rate, a number of existing IoT devices within the existing IoT network, a type of each existing IoT device within the existing IoT network, a supported encryption protocol, and a data type, a protocol, a standard, an IT architecture, a number of devices connected to the network, a data transfer viability, a scalability, and an environment of the IoT network.

18. The computer program product of claim 15, wherein the compatibility is determined only for IoT devices that exceed a minimum relevance score to save processing power on determining the compatibility of each IoT device.

19. The computer program product of claim 15, further comprising: presenting, by the processor, the removed IoT devices in a separate window along with one or more reasons why the removed IoT device is technically incompatible with the existing IoT network associated with the user.

20. The computer program product of claim 15, wherein the reordering the IoT devices and removing the technically incompatible IoT devices includes augmenting a graphical user interface of a user computing device to change an appearance of the graphical user interface to improve a user purchase decision for user.

* * * * *